United States Patent [19]

Lemelson

[11] 3,946,896

[45] Mar. 30, 1976

[54] CONTAINER WITH TEAR-WELD OPENING MEANS

[76] Inventor: Jerome H. Lemelson, 85 Rector St., Metuchen, N.J. 08840

[22] Filed: Dec. 3, 1973

[21] Appl. No.: 421,114

Related U.S. Application Data

[63] Continuation of Ser. No. 192,378, Oct. 26, 1971, Pat. No. 3,802,594, which is a continuation-in-part of Ser. No. 783,320, Dec. 12, 1968, Pat. No. 3,615,034, which is a continuation-in-part of Ser. No. 609,397, Jan. 16, 1967, Pat. No. 3,426,959, which is a continuation-in-part of Ser. No. 362,868, April 27, 1964, Pat. No. 3,311,288.

[52] U.S. Cl. ............. 220/273; 220/359; 229/51 AS
[51] Int. Cl.² ........................................ B65D 39/12
[58] Field of Search .......... 220/53, 27; 229/43, 7 R, 229/51 AS, 51 D, 51 ST

[56] References Cited
UNITED STATES PATENTS 2,870,935    1/1959    Houghtelling ....................... 220/53
3,516,852    6/1970    Janssen et al. ...................... 220/359

Primary Examiner—George T. Hall

[57] ABSTRACT

A structure is provided in a container having a fluent material, such as a liquid or powder, to be selectively dispensed therefrom, and a simple, quick opening means for the container which may be effected without the need for special tooling such as a can opener.

In one form, an opening is provided in the wall of a metal, plastic or paperboard container through which the contents thereof may be dispensed. Simple closure means is provided in the form of a short plastic or metal strip which is sealed to the container around the opening to close off same. The strip contains an unsealed tab portion at one end thereof which normally lies flat against the container wall and may be easily lifted by hand and pulled to break the seal with the wall of the container and to expose the opening.

6 Claims, 22 Drawing Figures

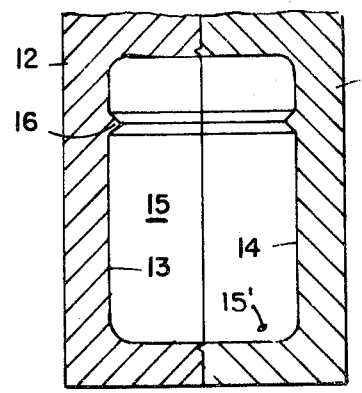 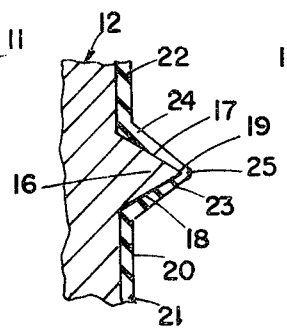 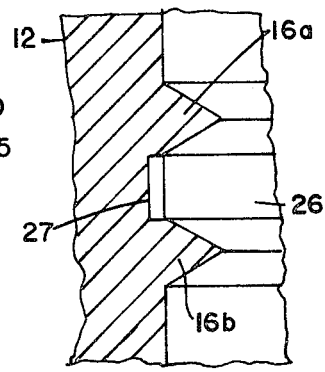
Fig. 1    Fig. 2    Fig. 3
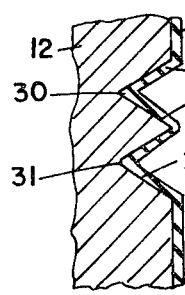 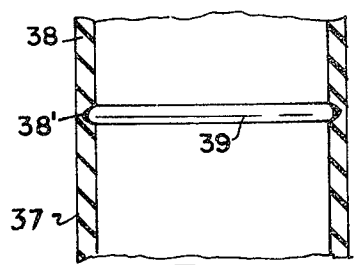 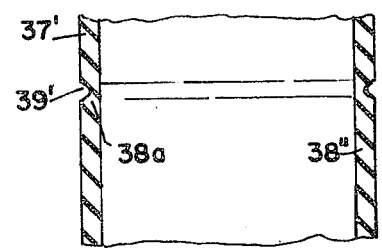
Fig. 4    Fig. 5    Fig. 6
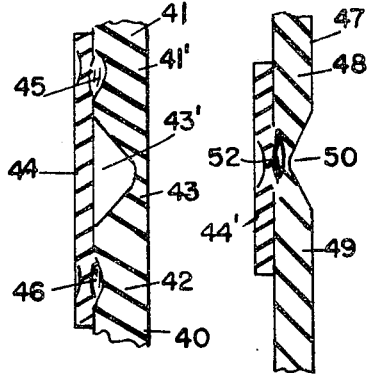 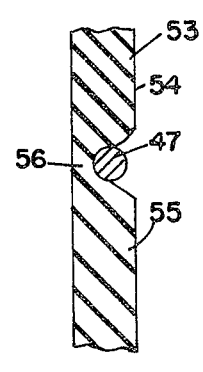 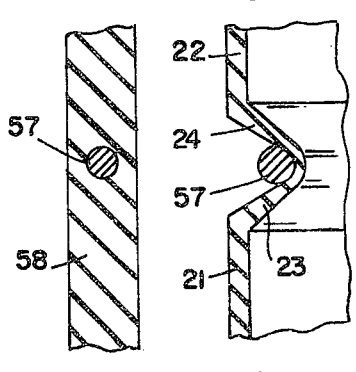
Fig. 7    Fig. 8    Fig. 9    Fig. 10    Fig. 11

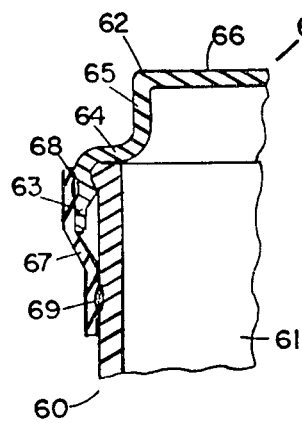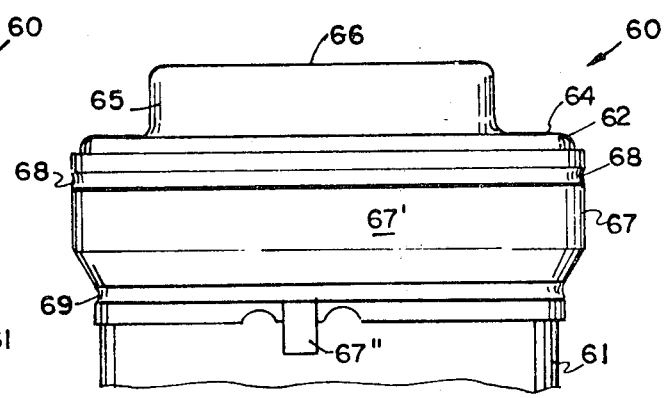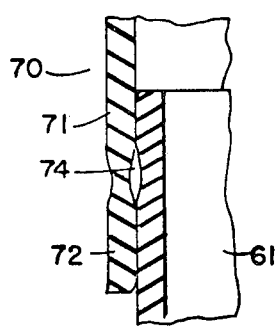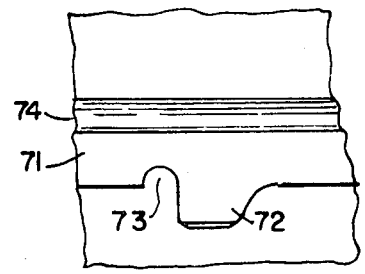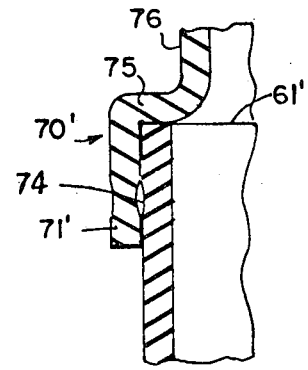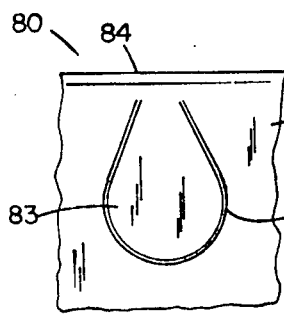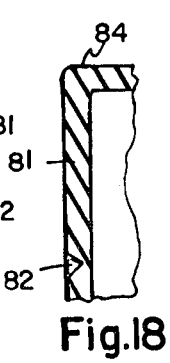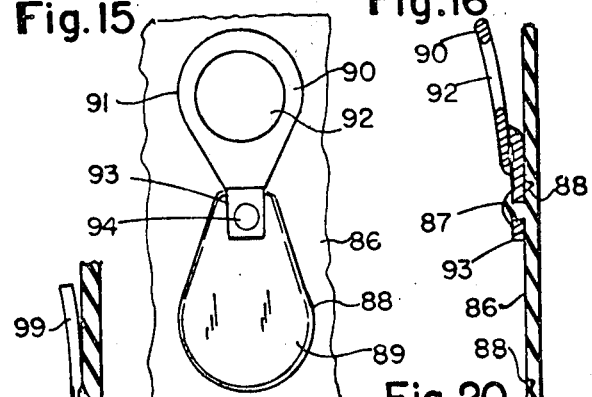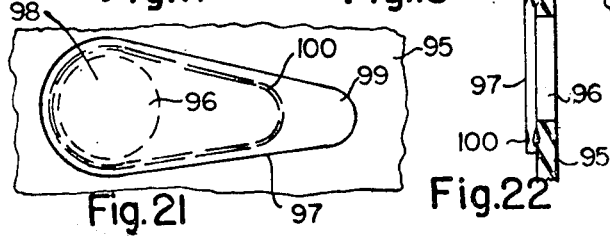

CONTAINER WITH TEAR-WELD OPENING MEANS

RELATED APPLICATIONS

This is a continuation of application Ser. No. 192,378 filed Oct. 26, 1971, now Pat. No. 3,802,594, as a continuation-in-part of Ser. No. 783,320, filed Dec. 12, 1968, now U.S. Pat. No. 3,615,034, which was a continuation-in-part of Ser. No. 609,397, now Pat. No. 3,426,959, filed Jan. 16, 1967 in turn a continuation-in-part of Ser. No. 362,868 filed Apr. 27, 1964, now Pat. No. 3,311,288.

SUMMARY OF THE INVENTION

This invention relates to an easy opening means for a container such as a metal can, plastic bottle or canister or paperboard container for a liquid or particulate product.

Various means have been proposed and are utilized to open containers with and without the use of a tool such as a can opener. In the dispensing of many liquid and powdered products, particularly for consumer use, it is desirable to provide a closed container therefor with a means for rapidly effecting the opening of the container such as by a pulling action. It is known in the art to provide a score line in the top of a metal can, for example, and to attach a ring thereto which, when pulled, effects a shearing tear along the line which permits the entire material interior of the line to be removed and to provide an opening. Such an operation generally requires a substantial amount of force and many persons find it difficult to shear and completely remove that portion of the wall of the container necessary to provide the opening.

The instant invention is concerned primarily with the provision of new and improved structures in pull-type opening means for containers which are easy to apply to the wall of various containers made of different materials and which provide adequate and sufficient closures for the containers yet which may be easily removed to provide openings in the containers through which the product may be dispensed.

Accordingly, it is a primary object of this invention to provide a new and improved structure in a container and in an opening means therefor which may be easily manipulated by hand to permit the dispensing of the contents of the container.

Another object is to provide a method for forming and filling a container with liquid or powdered contents and providing a simple and easy opening means therefor.

Another object is to provide new and improved structures in pull tab openings for a variety of containers manufactured of different materials such as plastics, metals and paperboard.

Another object is to provide a new and improved method for sealing container portions together in a manner to secure and hermetically seal the container yet permit the opening thereof without difficulty.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a cross-sectional view of part of a molding apparatus including a mold utilized for blow molding a hollow container in accordance with the teachings of the instant invention;

FIG. 2 is a fragmentary view in cross-section of a portion of the mold shown in FIG. 1;

FIG. 3 is a fragmentary view in cross section of a modified portion of a mold employed to produce a container in accordance with the instant invention;

FIG. 4 is a fragmentary view in cross section of another form of mold structure utilized to produce a container in accordance with the instant invention;

FIG. 5 is a fragmentary view in side cross-section of a modified form of container or parison utilized to produce a container, the side wall of said container or parison containing a reduction in its thickness from the inside;

FIG. 6 is a modified form of container or parison having a side wall with a reduction in thickness extending from the outside thereof;

FIG. 7 is a cross-sectional view of a portion of the side wall of a molded container having a reduction in wall thickness of the type provided in FIG. 6 and further having a circumscribing reinforcing strip-like element which is removable therefrom to permit opening of the container along the reduced cross-section portion;

FIG. 8 is a cross-sectional view of a portion of a container wall of the type shown in FIG. 5 and having a reinforcing removable element;

FIG. 9 is a cross-sectional view of a portion of a wall of a container having a wire element attached thereto which, when removed therefrom, is operative to sever the container wall;

FIG. 10 is a cross-sectional view of a portion of a container wall containing a wire integrally provided within the wall during the molding process;

FIG. 11 is a cross-sectional view of a container wall having a wire element secured in a recess formed in the wall for reinforcing the portions of the wall on both sides thereof and operative, when removed therefrom, to permit easy opening of said container;

FIG. 12 is a side cross-sectional view of a fragment of a container assembly showing a sealing strip member welded to respective portions of the container assembly to provide a hermetic or pressure seal and removable therefrom to permit openings of the container;

FIG. 13 is an end view of the container of FIG. 12;

FIG. 14 is a side view of a fragment of a container assembly formed by molding and having container portions which are spin welded together;

FIG. 15 is a side view of a fragment of a container assembly of the type shown in FIG. 14;

FIG. 16 is a fragmentary view of a cross-section of a portion of a modified form of container assembly.

FIG. 17 is a side view of a portion of a container wall showing an easy opening tab or door molded therein and defined by an open loop channel or groove molded into said wall;

FIG. 18 is an end view in cross section of FIG. 17;

FIG. 19 is a side view of a fragment of a container wall with a pull tab attached to a removable portion thereof;

FIG. 20 is a cross sectional view of the structure shown in FIG. 19;

FIG. 21 is a side view of yet another form of closure for a blow molded container and FIG. 22 is a cross sectional view of the structure shown in FIG. 21.

There is shown in FIG. 1 a portion of a mold assembly 10 comprising mold halves 11 and 12 shaped with inside walls 13 and 14 defining a molding cavity 15 into which a parison or the like is disposed by suitable known means (not shown) to be blown against said walls 13 and 14 and molded to conform to the shape thereof. In FIG. 1, the cavity is shaped to define a hollow object such as a plastic bottle or container having a substantially cylindrical side wall.

Formed in the walls of the mold halves 11 and 12 and protruding outwardly therefrom so as to project inwardly into the cavity 15 is a V-shaped, ridge-like formation 16 having tapering side walls 17 and 18 terminating at a relatively sharp apex line 19. The formation 16 preferably circumscribes the side wall of the mold cavity and is composed of formations 16a and 16b in the respective molds which align with each other to form substantially a single or continuous ridge around the inside of the mold wall.

When a plastic parison is blow molded to shape in the mold 10 and forced by internal fluid pressure to conform to the wall of the mold cavity, it is deformed against the V-shaped formation 16 which serves not only to provide a narrow channel circumscribing the wall of the molding but also to substantially reduce the thickness of the walls at the bottom of the channel as clearly shown in FIG. 2. The molding 20 is shown having cylindrical wall portions 21 and 22 on both sides of the channel or groove formed against the ridge formation 16 of the mold. Side walls 23 and 24 of the channel are shown tapering in thickness and meet at a minimal thickness region 25 at the base of the channel or groove resulting from flow of the material over the edge 19 and drawing thereof down the side walls of the ridge 16. The thickness of the wall at the apex line 25 is preferably such that it may be easily severed by a simple cutting implement such as a knife or razor blade or, in the extreme, may be sheared by twisting or pulling the portions of the portions 21 and 22 of the molding when it is desired to open the container. The degree of reduction in thickness of the parison wall when molded by means of apparatus of the type illustrated in FIGS. 1 and 2 will depend on a number of factors including the height and degree of taper of the ridge-like formation 16, the flow characteristics of the parison wall and the degree it is already blown when it contacts the wall of the mold.

In FIG. 3 is shown a modified form of mold wall of the type shown in FIGS. 1 and 2 wherein the single ridge-like wall formation is replaced with two such formations extending parallel to each other around the mold wall and denoted 16a' and 16b', there being a space 26 of flat cross sectional shape provided between the formations 16a° and 16b' to define a portion of the container wall which may be removed as by cutting or pulling from the container in order to sever the two portions of the container from each other along the two reduced thickness lines defined by the apex lines of the formations 16a' and 16b'. A suitably shaped sub-cavity 27 in wall portion 26 may serve to form a portion of the container wall which protrudes outwardly from the main wall and/or the portion formed against wall portion 26 to permit finger gripping and pull-tearing the strip formed between the grooves formed against ridges 16a' and 16b'. The wall portion of the container formed in sub-cavity 27 may be further worked in the mold or after the container is removed from the mold such as by thermally deforming, pinching, punching, drilling or otherwise forming same to facilitate starting the action of tearing the container wall along the groove lines thereof defined by apex lines 16a and 16b of the mold wall.

In FIG. 4 is shown another modification in the shape of the mold wall to effect a line-like reduction of thickness which is sufficient to permit the separation or pull tearing of the wall of the molding as described. The walls of the mold are provided with a pair of spaced apart, parallel circumscribing V-shaped cavities 30 and 31 defining therebetween a V-shaped ridge or band 32. Thus, the wall of the molding 33 is provided with a pair of protruding formations 34 and 35 which have tapered side walls and define a channel having a narrow band-like or line base 37 of minimum wall thickness operative to be severed as described above by either a cutting implement or by means of a shearing or pulling action applied to the container wall.

FIG. 5 shows a portion of the wall 38 of a container 37 formed by extrusion or blow molding of an extruded parison. A groove 39 is provided preferably circumscribing the inside surface of the wall to provide a narrow band-like portion 38' which is of substantially less thickness than the remainder of the wall as illustrated. The reduction in wall thickness is effected by the automatic or program controlled movement of an irregularly shaped mandrel in the extrusion die opening to reduce the annular spacing between the mandrel and the die for a short enough period of time to effect wall thickness reduction of the extrusion or parison such that when the article is blown to shape in the mold, the reduced wall thickness portion 38' will be formed and may be utilized per se to simplify opening of the container as described above or by the means provided hereafter. In other words, the thickness of the wall portion 38' may be such as to normally retain the container in one piece but permit it to be severed along the line or band of minimum thickness by twisting, pulling or cutting action.

In FIG. 6 is shown another modified form of extrusion or blow molding 37' having its side wall 38'' provided with a groove 39' circumscribing same so as to leave a narrow portion 38a of the wall of sufficiently reduced thickness to permit a tear opening to be effected in said wall or severance of the portions of the container on both sides of said reduced thickness portion by pulling, twisting or other action. The circumscribing groove or channel 39' may be formed in the blow molded container by parison control or programming or by means of a cutting tool operative to spin cut said groove therein by rotating about the container or by spinning the container with respect to the tool as in a lathe to permit the tool to cut said groove a sufficient depth to permit severance of the container portions on both sides thereof as described.

In FIG. 7 a portion of a wall 41 of a container 40 formed by blow molding as described or other form of molding is provided with a reduced thickness portion 43 which normally may be easily severed by applying a twisting or bending force between the upper portion 41 and the lower portion of the container. The reduced thickness portion 43 either circumscribes the side wall of the container such as a bottle or canister or circumscribes an area of the wall inwardly of which it is desired to remove or provide a flap-like opening to the container. If the section 43 is sufficiently reduced in thickness to permit separation of the upper and lower portions 41 and 42 of the container from each other without difficulty, such action may normally occur during handling of the container and, accordingly, in FIG. 7, a strip 44 of suitable plastic film or other material extends across the groove or channel 43' defining the reduced wall thickness section of the wall 40 and is welded or bonded along its upper and lower borders by circumscribing weld lines 45 and 46. The strip or band section 44 thus remains in place during normal packaging and handling operations and may be removed by a pulling operation tearing said strip along separated parallel score lines (not shown) or along the weld or bond lines 45 and 46. Once the strip 44 is removed, the upper and lower portions 41 and 42 of the container may be separated from each other by a bending, twisting or pulling action or by applying a cutting blade to the reduced thickness portion 43 of the container. It is noted that a container wall structure of the type shown in FIG. 3 may be reinforced with a tearable strip similar to 44 by bonding or welding said strip, for example, to the outer surfaces of the upper and lower portions 21 and 22 of the container. In many instances, the inside surface of the strip 44 may be coated with a pressure-sensitive adhesive permitting it to be easily applied and removed from the container wall.

Yet another structure in a tear strip means applicable to a blow molded container is shown in FIG. 8. The container 47 has a side wall composed of upper and lower portions 48 and 49 desired to be severed from each other or to have an opening formed therein by a simple pulling action. The wall portions 48 and 49 are separated by a wall portion 50 of reduced wall thickness. Disposed in alignment with and preferably overlapping or extending along the borders of the reduced thickness portion 50 is a strip 51 of flexible material such as a plastic having a higher tensile strength than the material of which the container is made. The strip or band 51 is welded or sealed to the reduced wall thickness portion 50 along the length thereof by a weld line 52 having the characteristics such that when then strip 51 is pulled away from the wall of the container, it will effect either a severance along the reduced thickness portion 50 or will sufficiently reduce the thickness of wall portion 50 such that a simple twisting, pulling or bending action effected by hand to the wall of the container will be operative to sever the upper and lower portions 48 and 49 from each other or will permit finger pushing in a tab-like portion of the container wall defined inwardly of the reduced section 50 and the weld line 52 extending therealong.

In FIG. 9 is shown a container having a wall 53 composed of upper and lower portions 54 and 55 and a reduced thickness portion 56 against and within which a wire or tear strip 57 is partially embedded. Pulling the wire 57 to the left by grasping an end thereof extending through the container wall, may be operative to completely sever the upper and lower portions 54 and 55 from each other. Pulling wire 57 to the right by grasping an end portion thereof, may be operative to sufficiently weaken the wall along portion 56 by removing the support provided by the wire or strip 57 to permit the container to be severed along said weakened portion by a pulling, twisting or bending action.

In FIG. 10, a container formed by extrusion or blow molding has a wire or tear strip completely encapsulated within its side wall which, when a force is applied to pull said wire or tear strip outwardly from the wall, the result is the weakening of said wall such that it may be easily opened thereafter as described. The wire or tear strip 57 which may be round or rectangular in cross section may have an end extending outwardly from the wall of the container to permit it to be easily grasped and pulled to remove it from the wall of the container for the purposes described.

In FIG. 11 is shown a modified form of the container molded by means of the apparatus shown in FIG. 2. A wire or tear strip 57 is shown secured within the groove defined by the tapered side wall portions 23 and 24 and is preferably either heat sealed therein or adhesively bonded thereto. When the strip or wire 57 is pulled outwardly from the wall of the container it may either serve to sever the container wall or to sufficiently reduce its strength upon removal such that a simple pulling, twisting or bending action may be operative to sever the upper and lower portions 22 and 21 of the container wall from each other or to provide a tab-like door to the container interior.

In FIG. 12 is shown a container assembly 60 composed of a lower container part 61 such as a cylindrical or cup-shaped canister or bottle made of thermoplastic or thermosetting material formed by injection or blow molding, vacuum or pressure forming apparatus. Slidably assembled to the upper end of the lower container member 61 is an upper container member or cover 62 having a downwardly depending side wall 63 engaging the upper portion of the side wall of 61, an inwardly depending shelf-like wall portion 64 having its lower surface resting on the upper rim of 61, an upwardly depending side wall 65 and a top wall 66 providing complete closure with the lower container member 61. In order to effect retained assembly and sealing of the two container members 61 and 62, a band or strip 67 of flexible thermoplastic material extends completely around the container assembly and overlaps portions of the side wall of container 61 and the side wall 63 of the upper container 62. A circumscribing weld line 68 is provided between the upper border of the band-like strip 67 and the side wall portion 63 of upper container member 62 and a second circumscribing weld line 69 is provided between band member 67 and the side wall of lower container member 61.

In FIG. 13, a side view of the assembly shown in FIG. 12, one end portion 67' of the strip 67 is shown having a tab-like flap 67'' extending downwardly therefrom which, when pulled upwardly and in the direction in which the strip extends around the wall of the container assembly, is operative to sever both the weld lines 68 and 69 in a shearing action so as to permit removal of the band 67 from the container assembly and opening of the assembly. In other words, the weld or bonding lines 67 and 69 are of such a nature that they may be torn or severed along their length by a simple pulling action on the band 67 started by grasping the tab-like portion 67'' between the thumb and forefinger.

In FIGS. 14 and 15 is shown another modified form of joining means for container assemblies. The lower container 61 has secured to its outer surface near the upper rim thereof a portion of the side wall of an upper container member 70 by means of a weld line 74 circumscribing the two container members. The upper container member 70 has a tab-like portion 71 extending downwardly therefrom and a cutout portion 72 extending to near the weld line 74 provided between the abutting side walls. When the tab 71 is pulled, a tear develops near the upper end of cutout 72 along the weld line 74 and the weld line may be thereby severed by continued pulling the tab 71 away from the container assembly. Thus, a strip of plastic defining the lower border of the upper container 70 may be completely removed from the container assembly and the circumscribing weld 74 provided between the two container members may be severed to permit opening of the container.

It is noted that circumscribing weld lines between cylindrical container assemblies of the types illustrated in FIGS. 7, 8 and 12–15 may be provided by so-called spin welding means whereby either the welding tool or container assembly is rotated in a fixture such as a welding lathe and the movement of a suitable tool against that portion of the assembly requiring welding is such as to frictionally heat and create the desired welding effect. Such action may also be effected by heating a welding tool and relatively moving tool and container assembly as described in a circular path. Welding may also be effected by energizing the welding tool with ultrasonic or radio frequency energy as the tool and container assembly relatively rotate. In yet another welding technique, the container and/or an intense radiation beam generating means such as a laser may be relatively moved to cause the beam to temporarily intersect the rotating components to create a circular weld or pair of welds therein of the type described.

Referring again to the embodiments shown in FIGS. 1 to 4 of the drawings, it is to be noted that the grooved wall structures shown may be applied to the sidewall of an open container which is filled after it has been removed from the mold and is hermetically sealed or pressure sealed thereafter after the contents therefore have been disposed within said open container and after a lid or cover has been placed on the open end thereof. The contents may also be disposed within a substantially closed container formed in the two piece mold shown through either the inflation needle or nozzle which is movable through a hole 15' in the mold wall to penetrate the wall of the molding or through a mandrel (not shown) protruding downwardly from the extrusion die opening and used to form the inside of the parison.

Tear strip or wire opening means such as those shown in FIGS. 9 to 11 may be secured to the wall of the molding as shown by relating said strip or wire against the wall of the mold during the blow molding procedure or by adding same after the molding is removed from the mold to the molding and spin welding or otherwise attaching the strip or wire thereto. The tear strips of FIGS. 7 and 8 may be spin welded to the wall of the container by rotating said container and bringing said tool to bear against the strip in a manner to generate frictional heat and properly weld the strip to the wall of the molding in a manner to permit the tear opening or weakening of the container wall as described.

In connection with the structure shown in FIG. 10, it is noted that the wire or thread or filament 57, shown disposed completely within the wall of the molding, may be so provided by feeding said wire or filament between concentric tubular extrusions which, when pressure is applied to the inner extrusion forms a single parison and single walled molding with said element 57 embedded in the wall as shown.

In connection with the structures shown in FIGS. 12 to 16 it is noted that the components shown as being welded together in a manner to permit the tear opening of the assemblies may be made of aluminum sheet material and aluminum foil, and may be spin cold welded, ultrasonically welded or resistance welded along the weld line or lines described in a manner to permit the tear opening thereof as described. The cap 60 shown in FIGS. 12 and 13 may be snap fit assembled with the rim of the lower container 61 so that it may be retained in place after the container has been opened for reclosing the container.

Further in connection with the wire opening means shown in FIGS. 9 to 11, it is noted that opening may also be effected by heating said wire by induction or electrical resistance heating means to a degree to melt or soften the wall of the container surrounding the wire to permit or effect its easy opening. Similarly, strips of metal may be used for the strips 44 and 44' of FIGS. 7 and 8 and may be inductively or resistance heated to effect opening and/or closure of the container by local heating and partical melting of the thermoplastic material of the container wall.

In FIG. 16, a container assembly 70' comprises a lower container unit 61 as described and an upper container unit or lid 71' assembled on the rim 61' of 61. A step 75 is provided in the sidewall of the lid 71' and rests against the rim 61'. A circumscribing weld line 74 seals and joins the lide 71' to the sidewall of 71' in a manner to be ruptured or sheared by pulling or twisting.

In FIGS. 17 and 18 is shown a structure in a wall of a plastic container 80 formed by injection or blow molding and provided with easy opening means such as a modified form of the described molded wall separation or opening means. The wall 81 of the molded plastic container is molded with a line-like groove or depression 82 therein which extends either as a closed loop channel around a portion 83 of the container wall which is desired to be removed or, as shown, as a partially closed loop therein if it is desired to merely push a portion of the mold wall without removing same to permit pouring out the contents while retaining the wall portion as a flap.

In one form, the groove 82 is so designed that pushing in on the wall portion 83 with the finger, thumb or an implement will be operative to shear or tear the weakened or reduced thickness portion of the wall defined by the groove or channel 82 so as to either sever the entire wall portion 83 or cause it to swing inwardly as a flap and provide an opening to the inside of the container 80 through which the contents may be poured or otherwise removed therefrom. Notation 84 refers to the edge of the wall 81 of the container 80 against which a opening device (not shown) such as a prying type can opener may be hooked to permit the end of the opener to be brought to bear against area 83 of the wall and, when the opener device is operated to cause its end to push against the surface of 83, it forces said tab to push inwardly severing the wall material along the groove 88.

It is noted that a strip or patch of peelable or tear-off plastic may be disposed across the groove 82 and area 83 and welded or bonded to the wall 81 to support and strengthen the mold wall and prevent pushing in of the portion 83 during normal handling.

In FIGS. 19 and 20 is shown another structure in a tearable or rupturable wall 86 of a plastic container 85 for liquids, pourable solids or other articles. Molded into the wall 86 as described is a groove 88 defining a closed loop line of such weakness and dimension that, once a tear or rupture is developed therein, it may be continued to permit the complete removal of the portion 89 inwardly of the groove 88. Fastened to the removable portion 89 of the wall 86 is a pull member 90 made of plastic or metal and having a looped head 91 with an opening 92 through which the forefinger of the hand may be placed to exert an outwardly on the tab for removing the removing the removable portion of the container wall. The tab head 90 is connected to or extends from a necked-down portion 93 which is fastened near its end to one end of portion 89 of the wall 86. Fastening is affected by molding wall 86 with a pin-like protrusion 86 which extends normal to an outwardly from the container wall 86 as shown in FIG. 20, providing a hole 94 in portion 93 of the pull member 90, assembling said member 90 to the wall 86 by passing protrusion 87 through hole 94 and upsetting the end portion of said protrusion 87 against the outer face of portion 93 as shown such as by heating and compressing same with a tool. If the material comprising member 90 is a thermoplastic polymer, the tab end portion 93 may be welded to the wall 86 with or without the provision of the upset protrusion 87 to effect fastening as described.

In yet another form of quick opening molded plastic container wall structure shown in FIGS. 20, 21 and 22, a container wall 95 is provided with an opening 96 therein by molding or other means and a closure 97 in the form of a sheet or film-like tab 97 having a bottom portion 98 which is welded in a closed loop adhesive bond or weld line 100 about opening 96 in a manner to be removable from the wall 95 by pulling on a flap-like portion 99 of said tab 97 which is not welded to the wall 86 and extends beyond the opening 96.

It is noted that the various containers having easy opening portions and other novel structures as hereinbefore described may be produced from an injection molded tube or parison which is blow molded to shape between closed mold sections. By properly premolding the parison with suitable cross sectional reductions such as those illustrated in FIGS. 4, 7, 6, 11, and 17–22 defining a groove or channel-like indentations in the walls of the finished containers, such reductions in cross section may be retained in the blow molding and controllably formed therein as to permit easy opening of the container by twisting, pulling or bending actions as described. In other words, while it may be difficult to properly reduce the thickness of portions of the walls of containers to degree necessary to effect opening or shearing thereof as described by pure blow molding the combined operations of forming said by injection and blow molding procedures may offer the desired degree of control necessary to effect a predetermined structure capable of being fractured to severed as described.

By injection molding a parison of materials having different physical characteristics such as low or medium and high density polyethylene, flexible and rigid vinyl, and other combinations of rigid and flexible, variable rigidity or high and low strength plastics, containers may also be blow or injection molded having high strengh and low strength portions of its wall or walls which will permit the easy opening thereof by pulling, tearing or other action, such as puncturing with an implement. Such containers may also be produced by parisons which are extruded of two different polymers, one flexible and one more rigid as described each being fed in sequence to the forming portion of the extrusion die to form complete cross sections of the parison or both being applied simultaneously during the complete extrusion cycle or during but part of the extrusion cycle to form parisons with but selected portions of their walls made of flexible or weaker material than other portions thereof, capable of being torn, sheared or otherwise worked or used.

It is also noted that the constructions shown in FIGS. 7–11 wherein tearstrips, wires and the like are incorporated in or added to the wall of the container, may be formed by coextruding two different plastic materials and blow molding same together. For example, the strips 44 and 44' of FIGS. 7 and 8 may be coextruded of higher density or strength polymers with the major portion of the parison material provided to form the wall of the container being extruded of a lower density or lower tensile or shear strength material so that pulling on the tear strip material as described will be effective in causing severance of the wall as described. The wire-elements 47 and 57 of FIGS. 9–11 may also be formed of extruded material coextruded in or on the parison wall in the longitudinal direction and used not only to effect easy and quick opening of the container as described but also to reinforce the wall thereof. Special tooling located in the mold or predeterminatley operated after the container is molded to shape and removed from the mold may be operative to separate a portion or portions of the tear strip or wire elements from the wall of the molded container to permit it to be easily pulled away from the wall in the act of tear opening or effecting closure of the container after opening. Tear opening gripping means such as the illustrated pull strips 44, 44', 47, 96 and 97 may also be molded with or attached to the injection molded parison prior to blow molding same to shape. These members may also be disposed in the mold and attached to the molding as it is blown or otherwise formed therein. Fastening means for the pull strips or finger grips such as the protrusion 87 of FIGS. 19 and 20 may also be formed as part of the injection molded parison and/or the blow molded piece in the blow mold.

Additional features of the instant invention are noted as follows:

a. Supporting elements and tear strip elements such as those defined by notations 44, 44', 47, 50, 57, 90 and 97 may be fed individually or in strip formations to each container at an applying and fastening station where these elements may be either heat sealed, spin welded or ultrasonically welded or bonded in place on the wall of the container, as shown, on an automatic basis.

b. The supporting and tear strip elements 44, 44', 47, 50, 57 90 and 97 may also be extruded in situ against the container wall and pressure or spin welded in place by the application of a suitable die thereto.

c. The strips or filaments 44, 44', 47, 57 of FIGS. 7–11 may be coextruded with the base materials 41, 47, 53 and 58 which may comprise sheets or film of plastic containing attached tear elements for easy opening containers formed thereof. Said elements may be made of a polymer of greater tensile strength than the polymer comprising the sheet or form onto which they are extruded or brought to bear for attachment as shown.

It is to be noted that the containers hereinbefore described may also be formed of metal such as aluminum by either deforming sheet metal in a die by means of hydraulic or gas pressure applied as a single or plurality of pressure pulses or by shock waves generated in a gas or liquid. The containers may also be formed by impact extrusion means or a combination of impact extrusion and fluid pressure means applied either simultaneously wether immediately after the impact extrusion of the metal or during a secondary operation to provide the described reduced thickness portions of the wall of the container and or other portions thereof.

I claim:

1. A container assembly comprising:

a container defining a housing with a thin wall enclosing and containing fluent contents to be selectively dispensed therefrom, an opening formed in a portion of said container wall, and a closure disposed across and extending beyond said opening, said closure comprising an elongated flat strip of relatively thin flexible sheet material, a first portion of said elongated flat strip sheet material being welded against and sealed to the outside surface of said container along a weld line formed between said flat strip and said container wall which weld line completely surrounds said opening in said container wall, a second portion of said flat strip of thin sheet material defining said closure and comprising one end thereof, said second portion of flat strip material being unattached to said container wall and being of sufficient length to permit it to be grasped betweed the thumb and forefinger of the hand and to be pulled thereby outwardly from said container wall to permit the welding defined by the circumscribing weld line between said first portion and the outside surface of said container wall to be destroyed whereby the entire strip closure may be removed from said container wall and the opening in said container wall may be uncovered to permit the contents of said container to be dispensed through said opening.

2. A container assembly in accordance with claim 1 wherein said second portion of said elongated flat strip of thin sheet material is at least partly disposed flat against the outside surface of said container wall.

3. A container assembly in accordance with claim 2 wherein the endmost portion of said second portion of said flat strip of sheet material extends above the outside surface of said container wall permitting it to be easily grasped between the thumb and forefinger of the hand and pulled away from the container in the act of removing the strip from the wall of the container.

4. A container assembly in accordance with claim 1 in which said flat strip of flexible sheet material is made of a plastic polymer and is stronger than the seal between the strip and the outside wall of said container permitting the seal with said container wall to be broken by pulling on the unsealed portion of said strip without the destruction of the material of the strip.

5. A container assembly in accordance with claim 1 wherein said flat strip of relatively thin flexible sheet material is composed of metal and the wall of said container to which said strip is sealed is composed of metal, said seal between said strip and said container wall comprising a weld line formed between the materials of said strip and container wall and circumscribing the opening in the container wall.

6. A container assembly in accordance with claim 5 in which said strip and said container wall to which it is welded are both made of relatively thin aluminum and the weld between said strip and said container wall is a molecular bond therebetween.

* * * * *